(12) United States Patent
Sastry

(10) Patent No.: US 7,325,004 B2
(45) Date of Patent: Jan. 29, 2008

(54) METHOD OF RETRIEVING RECORDS FROM A DATABASE

(75) Inventor: Nishanth Sastry, Concord, MA (US)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 10/898,790

(22) Filed: Jul. 26, 2004

(65) Prior Publication Data
US 2006/0020584 A1    Jan. 26, 2006

(51) Int. Cl.
*G06F 17/00* (2006.01)
(52) U.S. Cl. .................................... 707/102; 707/104.1
(58) Field of Classification Search ...................... None
See application file for complete search history.

(56) References Cited
U.S. PATENT DOCUMENTS
6,434,543 B1    8/2002  Goldberg et al.
2003/0004914 A1  1/2003  McGreevy
2003/0078913 A1  4/2003  McGreevy
2007/0192337 A1*  8/2007  Chandrasekar et al. ..... 707/100

OTHER PUBLICATIONS

Programming with Packages (http://www.unix.org.ua/orelly/advprog/ch12_02.htm.*
SQL Reference (http://publib.boulder.ibm.com/infocenter/db2v7uw/topic/com.ibm.db2v7.doc/db2s.*

* cited by examiner

*Primary Examiner*—Sana Al-Hashemi
(74) *Attorney, Agent, or Firm*—Guerin & Rodriguez, LLP

(57) ABSTRACT

A method and system for retrieving records from a database are described. The method and system retrieve a first set of records from the database, determine a number of relevant records in the first set of records, compare the target number of relevant records to the number of relevant records, and retrieve a second set of records from the database when the number of relevant records in the first set of records is less than the target number of relevant records. The second set of records includes the first set of records and at least one additional record. Optionally, the number of records in the second set of records is determined by a second function of an ordered list of functions that are each dependant on at least one of a target value and an access attempt value.

16 Claims, 4 Drawing Sheets

METHOD OF RETRIEVING RECORDS FROM A DATABASE

FIELD OF THE INVENTION

The invention relates to accessing records in a database. More specifically, the invention relates to reducing the cost of retrieving records from a database.

BACKGROUND OF THE INVENTION

Generally, databases include large sets of records (informational items). The records are often arranged as rows of a table. Typically, a primitive that is defined by the database manufacturer describes the manner in which records are retrieved from the database. For example, DB2 allows for the retrieval of a first specified number of rows from the database. An Oracle database allows for the retrieval of a page of rows (e.g., rows M through N). Often the user or application requesting the records from the database does not have access to all of the returned records due to security restrictions. In order to retrieve a desired number of accessible records, the database is accessed repeatedly.

One known method of retrieving the desired number of records is to retrieve a first specified number of records from the database, discard the irrelevant records, retrieve more records from the database continuing with the first record that was not previously retrieved, and repeating this operation until the desired number of relevant records is reached.

The above method is undesirable in many instances. In databases such as DB2 and Oracle, the cost of retrieving records from the database can be approximated as the product of the fixed high cost of connecting to the database and the number of repeated connections to the database combined with the product of the fixed cost of retrieving one record from the database and the total number of retrieved records. For a reasonably low desired number of records (e.g., records associated with a screen display), the connection costs dominates the other costs. Thus it is desirable to minimize the number of connections to the database.

SUMMARY OF THE INVENTION

In general, the invention is directed to reducing the number of connections to the database by using a hierarchical set of mathematical functions to increase the number of records retrieved with each successive connection to the database.

In one aspect, the invention features a method of retrieving records from a database. The method includes retrieving a first set of records from the database, determining a number of relevant records in the first set of records, comparing the target number of relevant records to the number of relevant records, and retrieving a second set of records from the database when the number of relevant records in the first set of records is less than the target number of relevant records. The second set of records includes the first set of records and at least one additional record.

In one embodiment, the second set of records contains a number of records determined by a function of an ordered list of functions prioritized such that the number of records retrieved increases.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
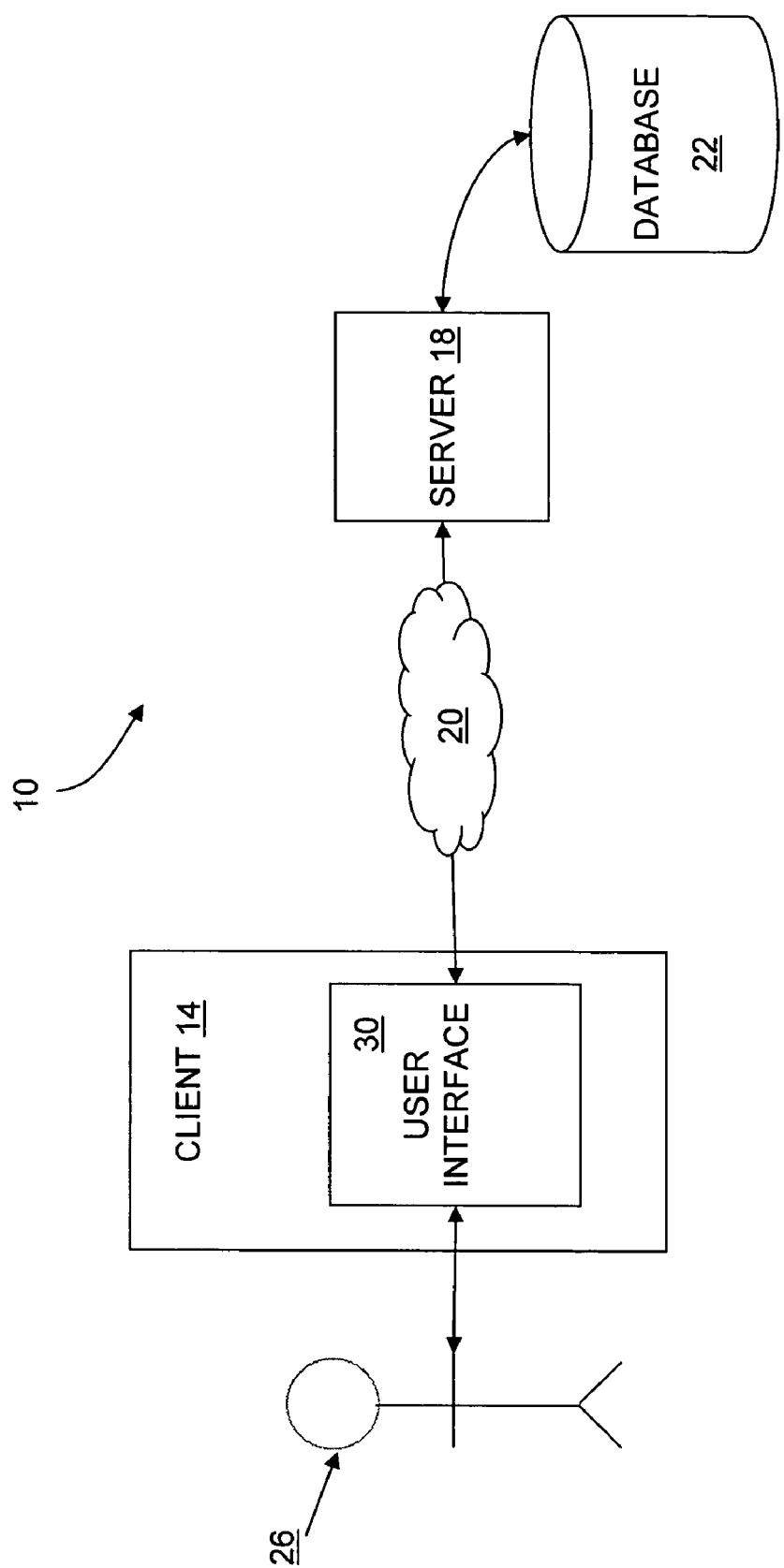
FIG. 1 is a block diagram of a client-server environment within which the present invention can be practiced.

FIG. 1 shows a computing environment 10 in which the invention can be practiced. The computing environment 10 includes a client system 14 in communication with a server system 18 and a database 22. The client system communicates with the server system 18 over a network 20.

The client system 14 can be any computing device, such as a personal computer, wireless device, information appliance, cell phone, personal digital assistant (PDA) or other computing device, that has hardware such as a display screen, one or more input devices (e.g., keypad, stylus, keyboard, mouse, touch-pad, and trackball), a processor for executing application programs, and sufficient persistent storage for storing such application programs and related information. The application programs can include a user interface 30 to provide a means for the user 26 to request information from the database 22.

The server system 18 can include a plurality of computing devices similar to those of the client system 14. Alternatively, the server system 18 can be a stand alone computing device.

The network 20 can be a local-area network (LAN), a metro-area network (MAN), or wide-area network (WAN), such as the Internet or World Wide Web. Users of the client system 14 can connect to the network 20 through one of a variety of connections, such as standard telephone lines, digital subscriber line, LAN or WAN links (e.g., T1, T3), broadband connections (Frame Relay, ATM), and wireless connections (e.g., 802.11(a), 802.11(b), 802.11(g)).

The database 22 is a relational database, such as a DB2 database sold by International Business Machine of Armonk, N.Y. Other databases, such as Oracle, or MySQL, can also be used.

During operation, a user 26 interacts with the client system 14 using the user interface 30 presented to the user that is part of an application program executing on the client system 14. The various applications executing on the client system 14 access the database 22 to retrieve information the applications may need to present to the user 26. For example, the user 26 may want to generate a report that requires information stored in various records of the database 22. The user 26, through the use of the user interface 30 of the client system 14, requests the report, which in turn, causes the database application 34 to requests records from the database 22. To communicate information across the network 20, in one embodiment, the client and server systems 14, 18 use standard transport protocols, such as TCP/IP and the hypertext transfer protocol (HTTP).

Figure 2:
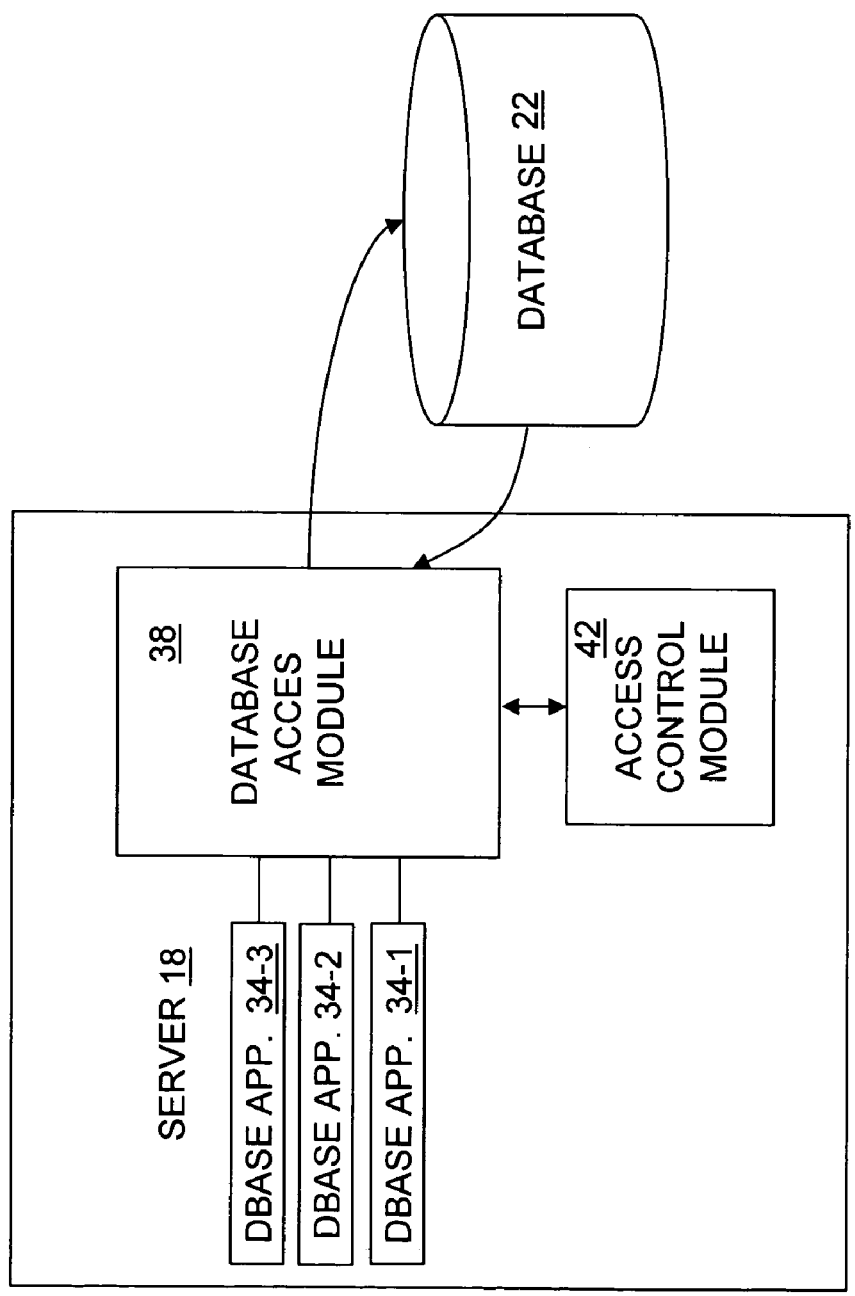
FIG. 2 is a block diagram of an embodiment of the server system of FIG. 1.

With reference to FIG. 2, the server system 18 includes a plurality of database applications 34-1, 34-2, 34-3 (generally, database application 34), a database access module 38 that communicates with the database applications 34, and an access control module 42 that communicates with the database access module 38. In one embodiment, one of the database applications 34 is a J2EE Enterprise Application executing on the Websphere Application Server sold by International Business Machine of Armonk N.Y. The Websphere Application Server is a portion of the Websphere software platform sold by International Business Machine of Armonk, N.Y. Additional Websphere applications can be installed and executed on the server system 18. For example, the database access module 38 can be the Websphere Portal Content Publishing application. The database access module 38 provides a means to request and retrieve records from the database 22. The retrieved records are communicated to the various database applications 34 by the database access module 38.

The database access module 38 and the access control module 42 cooperate to determine if the user 26 has the appropriate access level to view the retrieved records. The access control module 42 analyzes an access control parameter associated with each record to determine whether to grant access to the record. In one embodiment, the access control module 42 scores a list of users and their respective access levels. Alternative methods of access control can be implemented using, for example, encryption keys and the like. If additional records are required by the database application 34 after the access control check, the database access 38 module requests additional records.

Figure 3:
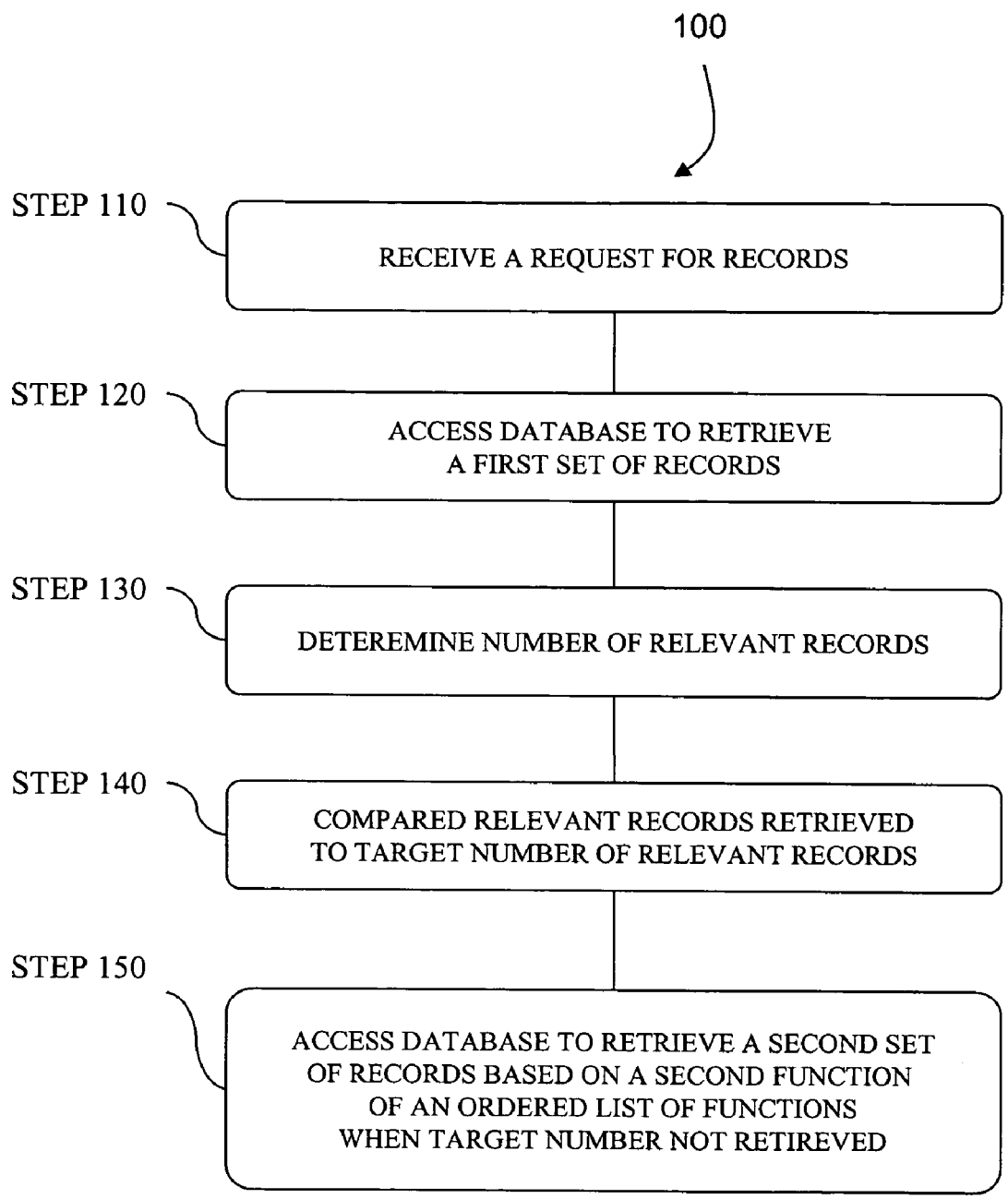
FIG. 3 is a flow chart of an embodiment of a method for retrieving records from a database according to principles of the invention.

FIG. 3 depicts an embodiment of a method 100 of retrieving records from the database 22 according to principles of the invention. The server system 18 receives (STEP 110) a request for the database records from the application executing on the client system 14. In one embodiment, the application is a web application that dynamically generates a report to display to the user 26 through the user interface 30. The database application 34 analyzes the request and fetches a target number T of records requested by the application. The database access module 38 accesses (STEP 120) the database to request a first set of records. The number of records included in the first set of records can be chosen in a variety of ways. For example, the number of records in the first set of records can be the target number T or can be predetermined in accordance with the type of database 22. In a preferred embodiment, the number of records in the first set of records is determined by inserting the target number T of records into one function of a set of increasing hierarchical functions. For example, one set of increasing hierarchical functions is $T, T^2, T^3, T^4, T^5, \ldots$. Other sets of increasing hierarchical functions include, but are not limited to, $T*\log(T), T*\log(T)^2, T*\log(T)^3, T*\log(T)^4, T*\log(T)^5, \ldots; 2^T, 3T, 4^T, 5^T, 6^T, \ldots;$ and $\log(T), T*\log(T), T^2, T!, T^T$. Subsequent functions in the set of increasing hierarchical functions increase in value for the same value of T. In some instances the set of increasing hierarchical function can be represented by a mathematical expression. For example $T^i$, $T*\log(T)^i$, or $(i+1)^T$, where i is equal to the number of accesses to the database.

After retrieving the first set of records from the database 22, the number of relevant records is determined (STEP 130). For example, an access control parameter for each record of the first set of records is analyzed. Various access control parameters can be used. For example, an access level of the user can be compared to the access control level associated with the record. If the user 26 possesses the required access level the record is deemed as a relevant record, otherwise the record is deemed as not relevant.

After the number of relevant records is determined, the number of relevant records and the target number T of records are compared (STEP 140). If the number of relevant records is greater than or equal to the target number T of records then the relevant records are displayed to the user 26. However, if the number of relevant records is less than the target number T of records, a second set of records is requested (STEP 150) from the database 22. The database access module 38 accesses the database 22 and retrieves the second set of records.

The second set of records includes the first set of records and at least one additional record. That is, each record that is included in the first set of records is also included as part of the second set of records. The number of records in the second set of records is determined by inserting the target number T of records into the second function of the hierarchical set of functions. For example, if the first access to the database 22 returned a first set of records having a total of T records, the second set of records includes a total of $T^2$ records when the set of increasing hierarchical functions is $T^i$. The number of relevant records in the second set of returned records is determined. The process of increasing the number of records retrieved per access to the database continues until the target number T of relevant records is reached or until it is determined that the target number T of relevant records does not exist in the database.

Increasing the number of records returned in each successive database access typically increases the number of relevant records retrieved. Including each record of the previous set of records in the present set of returned records obviates the need to track which records have already been returned and analyzed for relevancy. The processing cost required to determine the relevancy of a returned record is typically much less than the cost of accessing the database 22 and returning records. Also, including the first set of records in the second set of records provides additional options for access control. For example, an access control policy may not allow a user to view a first record and a second record simultaneously. If each access to the database returns only previously unretrieved records, retrieving the first record during a first access and the second record during a subsequent access can circumvent the access control policy because the first record and the second record are not analyzed together.

Figure 4:
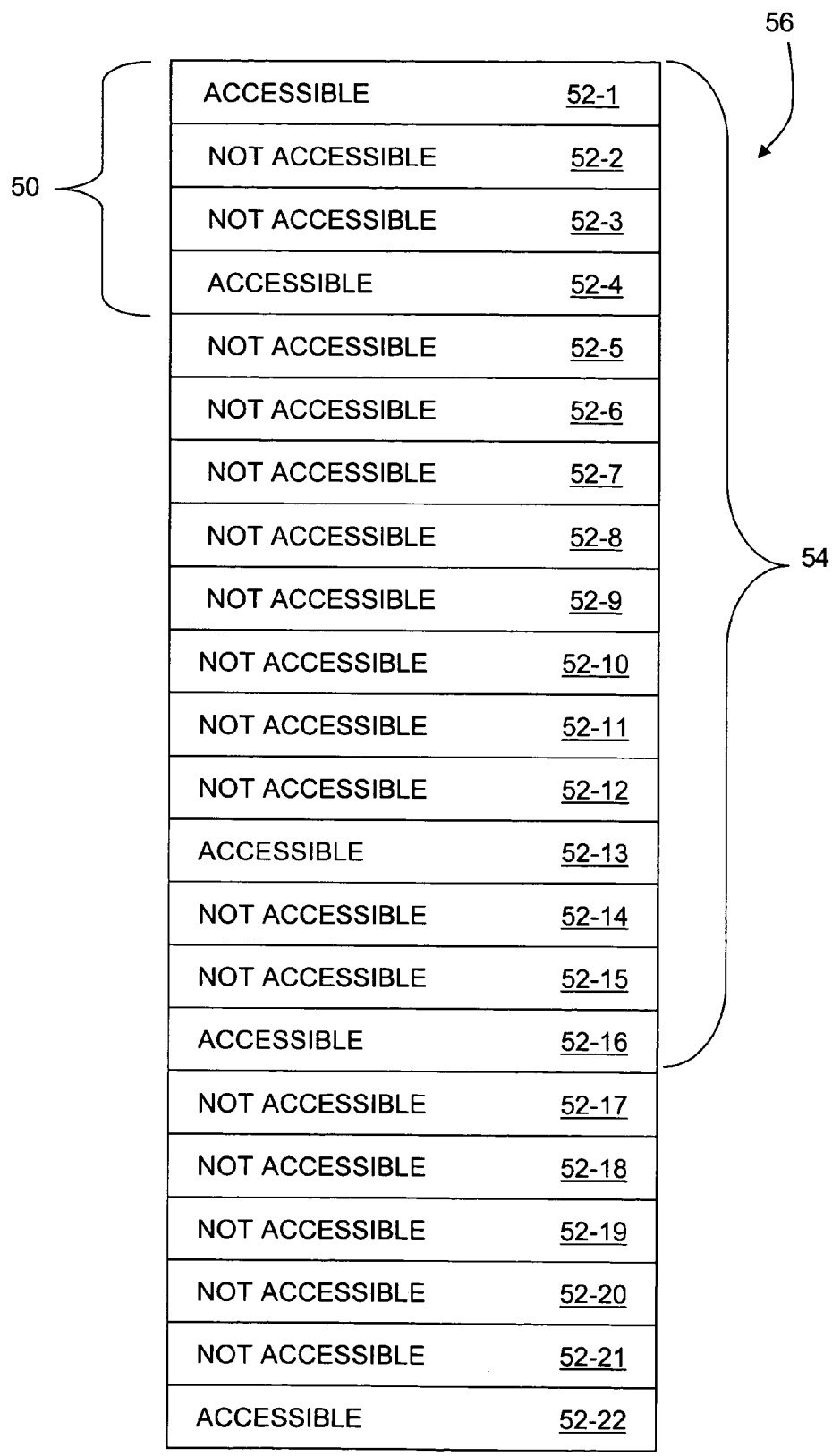
FIG. 4 is a block diagram of a set of database records.

FIG. 4 depicts a block diagram of the database 22 having a table 56 of records that are used to illustrate an embodiment of the retrieval feature of the invention. In one example, the user 26 requests four relevant records (i.e., the target number T of records is four) to generate an on-line report using a web application executing on the client system 14. In this example, the increasing set of hierarchical functions is $T^i$, where i represents the present number of accesses to the database 22. Thus, the first set of records 50 returned from the database 22 includes the first four records 52-1, 52-2, 52-3, 52-4 of the database 22. Checking the first set of records 50 for the number of relevant records results in two relevant records 52-1, 52-4. Therefore, a second set of records 54 is retrieved from the database 22. The second set of record 54 includes sixteen records (i.e., $4^2$) 52-1 to 52-16 and includes each record 52-1, 52-2, 52-3, 52-4 of the first set of records 50. Checking the second set of records 54 reveals that there are four relevant records 52-1, 52-4, 52-13, 52-16 in the second set of records 54. The web application receives the four relevant records 52-1, 52-4, 52-13, 52-16 and displays them the user 26 through the graphical user interface 30.

While the invention has been shown and described with reference to specific preferred embodiments, it should be understood by those skilled in the art that various changes in form and detail may be made therein without departing from the spirit and scope of the invention as defined by the following claims. Although described as a method and data file the invention can be embodied as instructions on a computer readable medium (e.g., compact disk, DVD, flash memory, and the like) that is sold and distributed in various commercial channels. Also, the instructions contained on the computer readable medium can be downloaded across a network (e.g., Internet). Additionally, the invention can be embodied as a computer data signal embodied in a carrier wave for retrieving records from the database 22.

What is claimed is:

1. A method of retrieving records from a database, comprising:
    retrieving a first set of records from the database;
    determining a number of relevant records in the first set of records retrieved from the database;
    comparing a target number of relevant records to the number of relevant records in the first set of records retrieved from the database, the target number being defined by a database application; and
    retrieving a second set of records from the database when the number of relevant records in the first set of records retrieved from the database is less than the target number of relevant records, the second set of records including the first set of records and at least one additional record.

2. The method of claim 1 wherein determining a number of relevant records comprises analyzing an access level associated with each record of the first set of records to determine the number of accessible records retrieved in the first set of records.

3. The method of claim 2 wherein determining the number of accessible records comprises verifying an access level associated with a user to a security list to determine if the user has access to the record.

4. The method of claim 1 wherein the second set of records contains a number of records determined by a second function of an ordered list of functions each dependant on at least one of a target value and an access attempt value, each function being ordered with respect to the other functions according to the function value for a given target value and access attempt value.

5. The method of claim 1 wherein retrieving a first set of records comprises receiving a request from a web application for the target number of records and, in response, accessing the database to retrieve the first set of records.

6. A computer readable medium for retrieving records from a database, the computer readable medium comprising instructions to cause a processor to:
    retrieve a first set of records from the database;
    determine a number of relevant records in the first set of records retrieved from the database;
    compare a target number of relevant records to the number of relevant records in the first set of records retrieved from the database, the target number being defined by a database application; and
    retrieve a second set of records from the database when the number of relevant records in the first set of records retrieved from the database is less than the target number of relevant records, the second set of records including the first set of records and at least one additional record.

7. The computer readable medium of claim 6 wherein the instructions to determine a number of relevant records comprises instructions to analyze an access level associated with each record of the first set of records to determine the number of accessible records retrieved in the first set of records.

8. The computer readable medium of claim 7 wherein the instructions to determine the number of accessible records comprise instructions to verify an access level associated with a user to a security list to determine if the user has access to the record.

9. The computer readable medium of claim 6 wherein the second set of records contains a number of records determined by a second function of an ordered list of functions each dependant on at least one of a target value and an access attempt value, each function being ordered with respect to the other functions according to the function value for a given target value and access attempt value.

10. The computer readable medium of claim 6 wherein the instructions to retrieve a first set of records comprise instructions to receive a request from a web application for the target number of records and, in response, access the database to retrieve the first set of records.

11. An apparatus for retrieving records from a database, the apparatus comprising:
    means for retrieving a first set of records from the database;
    means for determining a number of relevant records in the first set of records retrieved from the database;
    means for comparing a target number of relevant records to the number of relevant records in the first set of records retrieved from the database, the target number being defined by a database application; and
    means for retrieving a second set of records from the database when the number of relevant records in the first set of records retrieved from the database is less than the target number of relevant records, the second set of records including the first set of records and at least one additional record.

12. The apparatus of claim 11 wherein the means for determining a number of relevant records comprises means for analyzing an access level associated with each record of the first set of records to determine the number of accessible records retrieved in the first set of records.

13. The apparatus of claim 12 wherein the means for determining the number of accessible records comprises means for verifying an access level associated with a user to a security list to determine if the user has access to the record.

14. The apparatus of claim 11 wherein the second set of records contains a number of records determined by a second function of an ordered list of functions each dependant on at least one of a target value and an access attempt value, each function being ordered with respect to the other functions according to the function value for a given target value and access attempt value.

15. The apparatus of claim 11 wherein the means for retrieving a first set of records comprises means for receiving a request from a web application for the target number of records and, in response, accessing the database to retrieve the first set of records.

16. A method of retrieving records from a database, comprising:

retrieving a first set of records from the database;

determining a number of relevant records in the first set of records retrieved from the database;

comparing a target number of relevant records to the number of relevant records in the first set of records retrieved from the database, the target number being defined by a database application;

retrieving a second set of records from the database when the number of relevant records in the first set of records retrieved from the database is less than the target number of relevant records, the second set of records including the first set of records and containing a number of records determined by a second function of an ordered list of functions each dependant on at least one of a target value and an access attempt value, each function being ordered with respect to the other functions according to the function value for a given target value and access attempt value;

determining a number of relevant records in the second set of records retrieved from the database; and comparing the target number of relevant records to the number of relevant records in the second set of records retrieved from the database.

\* \* \* \* \*